United States Patent [19]
Barenyi et al.

[11] 3,788,681
[45] Jan. 29, 1974

[54] ARRANGEMENT OF THE DRIVE AND SUPPORT OF WINDSHIELD WIPERS

[75] Inventors: Bela Barenyi, Maichingen; Gerhard Busch, Gechingen, both of Germany

[73] Assignee: Daimler-Benz Aktiengesellschaft, Stuttgart-Unterturkheim, Germany

[22] Filed: Mar. 24, 1972

[21] Appl. No.: 237,842

[30] Foreign Application Priority Data
Mar. 25, 1971 Germany..........................2114424

[52] U.S. Cl............ 296/28 R, 15/250.31, 296/84 R
[51] Int. Cl. ............................................. B60s 1/04
[58] Field of Search. 296/28 G, 28 R, 84 R; 15/250, 15/250.16, 250.19, 250.27, 250.3, 250.31

[56] References Cited
UNITED STATES PATENTS
3,264,670   8/1966   Barenyi et al.................... 15/250.27
2,947,020   8/1960   Wilfert et al................... 15/250.3 X
3,606,629   9/1971   Parker ........................... 15/250.3 X FOREIGN PATENTS OR APPLICATIONS
1,295,601   5/1962   France............................. 15/250.31
  841,385   2/1939   France............................. 15/230.31
1,368,673   6/1964   France............................. 15/250.27

*Primary Examiner*—Kenneth H. Betts
*Assistant Examiner*—Leslie J. Paperner
*Attorney, Agent, or Firm*—Paul M. Craig, Jr. et al.

[57] ABSTRACT

An arrangement of the drive and bearing supports of windshield wipers for vehicles, especially for passenger motor vehicles, which are accommodated in front of the windshield pane; a sheet metal member adjoins the windshield which is connected with a front wall separating the engine space from the passenger space, whereby the drive and the bearing supports of the windshield wipers are mounted at the front wall.

22 Claims, 5 Drawing Figures

ARRANGEMENT OF THE DRIVE AND SUPPORT OF WINDSHIELD WIPERS

The present invention relates to an arrangement of the drive and of the bearing supports of windshield wipers for vehicles, especially for passenger motor vehicles, which are accommodated in front of the windshield which is adjoined by a sheet metal member which is connected with a front wall or dashboard separating the engine space from the passenger space.

The fastening of the drive and of the bearing support of windshield wipers takes place in most known motor vehicles at the sheet metal member which adjoins the bottom edge of the windshield. The bearing bolts of the windshield wipers thereby extend through the sheet metal member and are connected with the wiper blades. The sheet metal member, for the most part, forms an angle and passes over from the pane surface of the windshield into an approximately horizontal surface which is then adjoined by an engine hood. The drive and the bearing supports are not readily accessible with such a prior art arrangement so that in case of a damage at the drive or at the support, a repair with considerable expenditure in time is required. Additionally, a sealing problem arises at the places at which the bearing bolts extend through the sheet metal member. Furthermore, this prior art solution is also very disadvantageous from the point of view of keeping the noise out of the passenger space.

The present invention is concerned with the task to provide an arrangement of the aforementioned type which is characterized by a particularly good accessibility. The present invention essentially consists in that the drive and the bearing supports of the windshield wipers are mounted at the front end wall or dashboard of the vehicle. Such an arrangement permits an extraordinarily simple assembly and dissassembly so that an immediate exchange of possibly damaged parts is possible. Additionally, sealing problems are eliminated whereas on the other hand, an optimum noise insulation with respect to the passenger space is assured.

In a structurally advantageous embodiment of the present invention, one or several brackets are provided for the drive and the supports, which are secured on the side of the front end wall or dashboard facing the engine space and/or the passenger space. It may thereby be structurally appropriate if the front end wall or dashboard is provided with indentations within the area of the bracket or brackets. In order to achieve a further noise reduction, elastic underlayers are provided in one advantageous embodiment according to the present invention between the bracket or brackets and the end wall or dashboard.

According to a further feature of the present invention, provision is made that the space which is formed by the sheet metal member and the end wall or dashboard is covered off by a hood closing off the engine space which terminates at a distance in front of the windshield.

With this construction, it is possible in a particularly simple manner to examine the entire windshield wiper installation by opening the engine hood. Additionally, it is very simple to protect or free all shafts and joints or the like from snow, ice and other soiling.

According to a still further feature of the present invention, the space is provided at its lowest place with a discharge aperture or drainage opening, to which is connected a line extending through the end wall or dashboard in the direction toward the engine space. It is prevented thereby that water can collect in this space.

Accordingly, it is an object of the present invention to provide a windshield wiper arrangement which avoids by simple means the aforementioned shortcomings and drawbacks encountered in the prior art.

Another object of the present invention resides in a windshield wiper arrangement for passenger motor vehicles in which the windshield wiper arrangement and all of its parts are readily accessible for purposes of inspection and/or exchange in case of repairs.

A further object of the present invention resides in a windshield wiper arrangement for motor vehicles which minimizes the time required for performing repairs.

Another object of the present invention resides in a windshield wiper arrangement for motor vehicles which not only elminates sealing problems but also optimizes the noise insulation of the passenger space with respect to the engine space.

Still another object of the present invention resides in a windshield wiper installation of the type described above which can be readily protected against snow, ice and soiling.

These and other objects, features, and advantages of the present invention will become more apparent from the following description when taken in conjunction with the accompanying drawing, which shows, for purposes of illustration only, several embodiments in accordance with the present invention and wherein.

Figure 1:
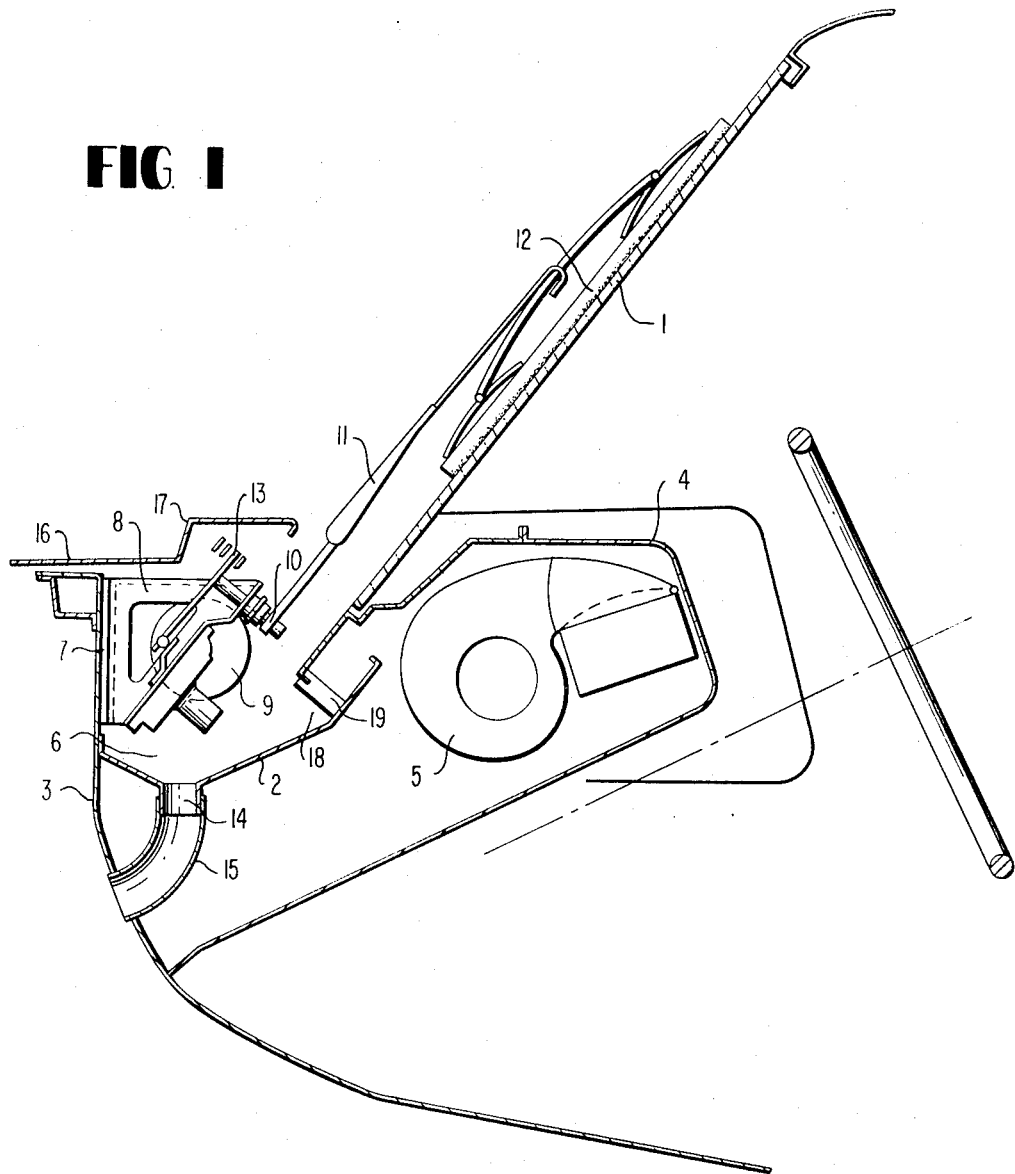
FIG. 1 is a cross-sectional view in the longitudinal direction of a passenger motor vehicle through a schematically illustrated windshield wiper installation in accordance with the present invention.

Referring now to the drawing wherein like reference numerals are used throughout the various views to designate like parts, and more particularly to FIG. 1, this FIGURE schematically illustrates the portion of a passenger motor vehicle within the area of its instrument panel. Within this area is arranged a windshield pane 1 which is adjoined by a sheet metal member 2; the sheet metal member 2 thereby extends at first in the direction of the windshield pane 1 and subsequently passes over into the horizontal and is connected with a front end wall or dashboard 3 which forms a partition wall that separates the passenger space of the passenger motor vehicle from the engine space. A further sheet metal member 4 extending inwardly toward the passenger space is connected at the sheet metal member 2; the further sheet metal member 4 forms the instrument panel and, for example, accommodates a fan 5. The other end of the sheet metal member 4 is then also connected again with the end wall or dashboard 3.

A space 6 disposed underneath the windshield pane 1 is constituted by the sheet metal member 2 adjoining the windshield 1 and the end wall or dashboard 3, in which is accommodated the drive and the bearing supports of the windshield wiper installation. A bracket 8 is secured at the end wall 3 under interposition of an elastic underlayer or support 7 of conventional type, which bracket supports the schematically illustrated windshield wiper motor 9 and the bearing supports 10 for the wiper arms 11 which are equipped with wiper blades 12 abutting against the windshield 1. All bearing supports or joints of the schematically illustrated transmission linkage 13 are additionally arranged at the bracket 8, which linkage transmits the rotary movement of the driving motor 9 and converts the same into a reciprocating wiper movement.

The sheet metal member 2 is provided at its lowest place which, for example, is disposed in the vehicle center, with a drainage aperture 14 to which is connected a hose 15 which extends through the front end wall or dashboard 3. In this manner, any water reaching the space 6 can drain off forwardly toward the engine space through the end wall 3. The space 6 is closed off by an engine hood 16 which is pivotally secured appropriately within the area of the forward end of the vehicle. The engine hood 16 which within the area of the wiper linkage 13 is provided with an upwardly directed step 17, terminates at a distance in front of the bottom edge of the windshield pane 1 so that the wiper arms 11 can be extended easily through the thus-created gap without requiring a seal.

The sheet metal member 2 is provided with an air inlet aperture 18 which contains a filter 19 or the like. Air can thus be conducted to the blower 5 through the gap remaining between the engine hood 16 and the windshield 1.

The illustrated arrangement is characterized by a particularly good accessibility and inspection capability of all parts thereof. By opening the engine hood 16, all part of the windshield wiper installation become visible and immediately accessible. Both the assembly as well as disassembly and any eventual repairs are therefore capable of being carried out in a particularly simple and time-saving manner.

Figure 2:
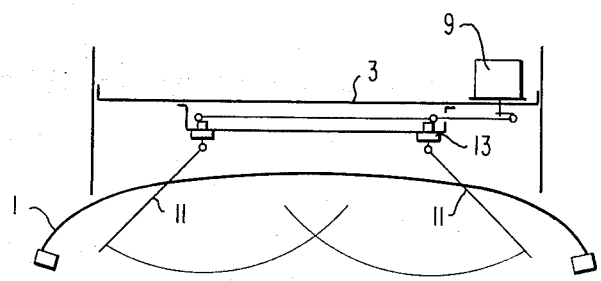
FIG. 2 is a plan view on a schematic windshield wiper installation in accordance with the present invention.

As shown in FIG. 2, the driving motor 9 and the transmission linkage 13 may be arranged on different sides of the partition wall or dashboard 3. In this embodiment, for example, a laterally arranged driving motor 9 is provided which is secured on the side of the partition wall 3 facing the engine space whereas the transmission linkage and the bearing supports are arranged on the side of the partition wall 3 facing the passenger space.

Figure 3:
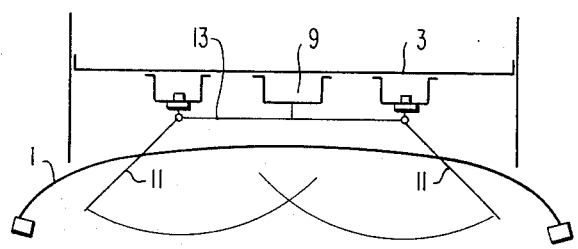
FIGS. 3–5 are schematic plan views on further embodiments of windshield wiper installations in accordance with the present invention.

In the embodiment according to FIG. 3, both the driving motor 9 as also the transmission linkage 13 are secured at the partition wall 3 on the side thereof facing the passenger space. The driving motor 9, which is arranged in the vehicle center, also drives the transmission linkage 13 in the center. In this embodiment, three mutually separate brackets are provided which are constructed of curved shape.

Figure 4:
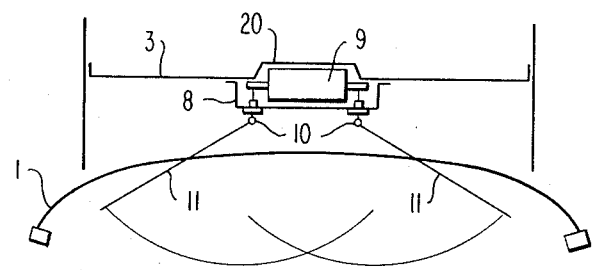

In the embodiment according to FIG. 4, the windshield wiper installation forms a structural unit which is secured at the partition wall or dashboard 3 symmetrically to the vehicle center on the side facing the passenger space. A driving motor 9 provided with outputs on both sides is used thereby so that a costly transmission linkage can be dispensed with. The bearing supports of the wiper arms 11 are mounted at a bracket 8 which also carries the driving motor 9. In this embodiment of the present invention, the partition wall or dashboard 3 is provided with an indentation 20 within the area of the driving motor 9.

Figure 5:
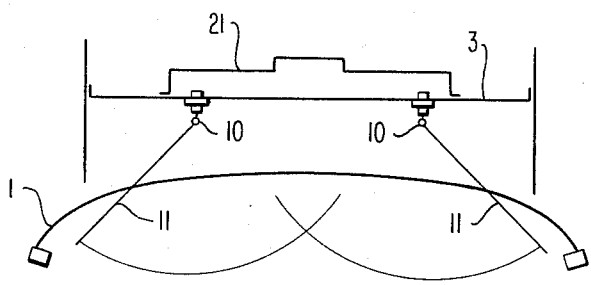

In the embodiment according to FIG. 5, both the transmission linkage as also the driving motor are secured at the partition wall or dashboard 3 on the side thereof facing the engine space. In this embodiment, only the drive shafts leading to the wiper arms 11 extend through the partition wall 3. The parts facing the engine space of the wiper installation are covered off with a cover hood 21.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An arrangement of drive and bearing support means for windshield wipers on a vehicle comprising:
    a vehicle passenger space,
    a vehicle engine space,
    end wall means separating said passenger space and engine space from one another;
    a vehicle windshield pane extending across a forward upper portion of said passenger space,
    first sheet member means extending from adjacent a lower edge of the windshield pane rearwardly into the passenger space and downwardly to an attachment at a lower part of said end wall means such that said first sheet member means closes off at least a portion of the passenger space in the forward direction with said first sheet member means being spaced rearwardly of said end wall means,
    second sheet member means positioned forwardly of said first sheet member means and extending from adjacent said lower edge of the windshield to the end wall means, said second sheet member means being connected to said end wall means at a position above the attachment of said first sheet member means to said end wall means,
    and mounting means for mounting windshield wiper drive and bearing support means directly at said end wall means at a position above said second sheet member means.

2. An arrangement according to claim 1, characterized in that the space which is constituted by the second sheet metal member means and the end walls means is provided with a drainage aperture at its lowest place to which is connected a line extending through the end wall means and leading toward the engine space.

3. An arrangement according to claim 1, wherein each of said first and second sheet member means are of sheet metal construction.

4. An arrangement according to claim 1, wherein a movable engine hood closes off the space formed above said second sheet member means and rearwardly of said end wall means with a small horizontal gap between said engine hood and said windshield pane for accommodating windshield wiper linkage means, whereby access to said windshield wiper driving and bearing support means is readily gained by moving said engine hood.

5. An arrangement according to claim 4, wherein said first and second sheet member means, in conjunction with lower portions of said end wall means, form a substantially closed hollow space for accommodating instruments with the side of said first sheet member means facing the passenger space forming an instrument panel.

6. An arrangement according to claim 5, wherein an air inlet and air filter is arranged between said first and second sheet member means immediately adjacent said lower edge of the windshield pane for admitting and filtering air from the space disposed above and forward of the second sheet member means to the space bounded by said first and second sheet member means and said lower portion of said end wall means.

7. An arrangement according to claim 6, wherein drainage aperture means are provided at respective lowest portions of said second sheet member means for draining liquid run-off from between said hood and windshield pane.

8. An arrangement according to claim 7, wherein conduit means are provided which extend from said aperture means downwardly and forwardly through said end wall means at a position intermediate said first and second sheet member means.

9. An arrangement according to claim 8, wherein each of said first and second sheet member means are of sheet metal construction.

10. An arrangement according to claim 1, characterized in that said mounting means includes at least one bracket means which is secured at said end wall means.

11. An arrangement according to claim 10, characterized in that each of the bracket means is secured on the side of the end wall means facing the engine space.

12. An arrangement according to claim 10, characterized in that each of the bracket means is secured on the side of the end wall means facing the passenger space.

13. An arrangement according to claim 10, characterized in that at least one of the bracket means is secured on the side of the end wall means facing the passenger space.

14. An arrangement according to claim 10, characterized in that an elastic support is provided between the bracket means and the end wall means.

15. An arrangement according to claim 10, characterized in that several bracket means are secured at said end wall means.

16. An arrangement according to claim 15, characterized in that the bracket means are secured on the side of the end wall means facing both the engine space and the passenger space.

17. An arrangement according to claim 10, characterized in that at least one of the bracket means is secured on the side of the end wall means facing the engine space.

18. An arrangement according to claim 17, characterized in that at least one of the bracket means is secured on the side of the end wall means facing the passenger space.

19. An arrangement according to claim 10, characterized in that the end wall means is provided with an identation within the area of the bracket means.

20. An arrangement according to claim 19, characterized in that an elastic support is provided between the bracket means and the end wall means.

21. An arrangement according to claim 20, characterized in that the space which is constituted by the second sheet metal member means and the wall means is substantially covered off by a hood closing the engine space, said hood terminating at a distance in front of the windshield.

22. An arrangement according to claim 21, characterized in that the space which is constituted by the second sheet metal member means and the wall means is provided with a drainage aperture at its lowest place to which is connected a line extending through the end wall means and leading toward the engine space.

* * * * *